(12) United States Patent
Tomita

(10) Patent No.: US 10,671,598 B2
(45) Date of Patent: Jun. 2, 2020

(54) CLIENT INFORMATION MANAGEMENT APPARATUS AND NON-TRANSITORY RECORDING MEDIUM

(71) Applicant: KONICA MINOLTA, INC., Chiyoda-ku, Tokyo (JP)

(72) Inventor: Kouichi Tomita, Kawanishi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 177 days.

(21) Appl. No.: 15/708,260

(22) Filed: Sep. 19, 2017

(65) Prior Publication Data

US 2018/0081929 A1 Mar. 22, 2018

(30) Foreign Application Priority Data

Sep. 20, 2016 (JP) ................................ 2016-182669

(51) Int. Cl.
  *G06F 16/23* (2019.01)
  *G06F 16/27* (2019.01)
  *G06F 16/248* (2019.01)

(52) U.S. Cl.
  CPC ...... *G06F 16/2365* (2019.01); *G06F 16/2379* (2019.01); *G06F 16/27* (2019.01); *G06F 16/2358* (2019.01); *G06F 16/248* (2019.01)

(58) Field of Classification Search
  CPC ...... G06Q 10/10; G06Q 10/105; G06Q 10/06; G06Q 10/107; G06F 16/23; G06F 16/2365; G06F 16/2379; G06F 16/24561; G06F 16/24564; G06F 16/282; G06F 2221/2117; G06F 2221/2141; G06F 2221/2145; H04L 12/1895; H04L 29/06; H04L 29/12056
  (Continued)

(56) References Cited

U.S. PATENT DOCUMENTS 8,706,692 B1 * 4/2014 Luthra .................... G06F 16/27
                                                    707/622
9,454,576 B1 * 9/2016 Kapoor ............. G06F 16/24564
(Continued)

FOREIGN PATENT DOCUMENTS

| JP | H10-143528 A | 5/1998 |
| JP | 2003-076702 A | 3/2003 |
| JP | 2009-129239 A | 6/2009 |

*Primary Examiner* — Dangelino N Gortayo
(74) *Attorney, Agent, or Firm* — Buchanan Ingersoll & Rooney PC

(57) ABSTRACT

A client information management apparatus comprises a hardware processor. The hardware processor performs: detecting a change in a department where one client member belongs and updating a department about one client member in client information if member name in client personal information is the same as a member name about the one client member registered with the client information and if the department in the client personal information differs from the department about the one client member registered with the client information; referring to the communication information and extracting a member relating to the one client member as an update target member from different client members registered with the client information; and updating a department about the update target member registered with the client information to the same department as the one client member.

28 Claims, 16 Drawing Sheets

(58) Field of Classification Search
USPC .................. 707/622, 627, 736, 802, 825
See application file for complete search history.

(56) References Cited

U.S. PATENT DOCUMENTS

| | | | |
|---|---|---|---|
| 2002/0046260 A1* | 4/2002 | Day, II .................... | H04L 29/06 |
| | | | 709/219 |
| 2002/0178138 A1* | 11/2002 | Ender ................. | G06F 16/2228 |
| 2003/0191751 A1* | 10/2003 | Vora ........................ | G06Q 10/10 |
| 2007/0016630 A1* | 1/2007 | Samji ...................... | H04L 63/20 |
| 2008/0189301 A1* | 8/2008 | Chen ....................... | G06Q 10/10 |
| 2009/0182607 A1* | 7/2009 | Morinville ............. | G06Q 10/06 |
| | | | 705/7.14 |
| 2010/0325058 A1* | 12/2010 | Roth ...................... | G06Q 10/10 |
| | | | 705/319 |
| 2013/0031052 A1* | 1/2013 | Lubin .................... | G06Q 10/10 |
| | | | 707/627 |
| 2017/0178077 A1* | 6/2017 | Inaba ..................... | G06Q 10/10 |

* cited by examiner

FIG. 5

CLIENT INFORMATION 14

| USER NAME (14a) | COMPANY NAME (14b) | DEPARTMENT (14c) | EMAIL ADDRESS (14d) | NEWLY REGISTERED DATE (14e) | DATE OF CHANGE (14f) | FORMER DEPARTMENT (14g) | PERIOD START DATE (14h) | PERIOD END DATE (14i) |
|---|---|---|---|---|---|---|---|---|
| MEMBER A | ABC Company | DEVELOPMENT DEPT. | aa@abc.com | 15/Apr/2013 | - | - | 1/Apr/2016 | 30/Sep/2016 |
| MEMBER B | ABC Company | DEVELOPMENT DEPT. | bb@abc.com | 1/May/2014 | - | - | 1/Apr/2016 | 30/Sep/2016 |
| MEMBER C | ABC Company | DEVELOPMENT DEPT. | cc@abc.com | 23/Jun/2014 | - | - | 1/Apr/2016 | 30/Sep/2016 |
| MEMBER D | ABC Company | PLANNING DEPT. | dd@abc.com | 3/Aug/2014 | - | - | 1/Apr/2016 | 30/Sep/2016 |
| MEMBER E | ABC Company | SALES DEPT. | ee@abc.com | 21/Aug/2014 | - | - | 1/Apr/2016 | 30/Sep/2016 |
| MEMBER M | XYZ Company | DEVELOPMENT DEPT. | mm@xyz.com | 22/Aug/2014 | - | - | 1/Apr/2016 | 30/Sep/2016 |

FIG. 6

CLIENT INFORMATION 14

| USER NAME | COMPANY NAME | DEPARTMENT | EMAIL ADDRESS | NEWLY REGISTERED DATE | DATE OF CHANGE | FORMER DEPARTMENT | PERIOD START DATE | PERIOD END DATE |
|---|---|---|---|---|---|---|---|---|
| MEMBER A | ABC Company | PLANNING DEPT. | aa@abc.com | 15/Apr/2013 | 28/Apr/2016 | DEVELOPMENT DEPT. | 1/Apr/2016 | 30/Sep/2016 |
| MEMBER B | ABC Company | DEVELOPMENT DEPT. | bb@abc.com | 1/May/2014 | - | - | 1/Apr/2016 | 30/Sep/2016 |
| MEMBER C | ABC Company | DEVELOPMENT DEPT. | cc@abc.com | 23/Jun/2014 | - | - | 1/Apr/2016 | 30/Sep/2016 |
| MEMBER D | ABC Company | PLANNING DEPT. | dd@abc.com | 3/Aug/2014 | - | - | 1/Apr/2016 | 30/Sep/2016 |
| MEMBER E | ABC Company | SALES DEPT. | ee@abc.com | 21/Aug/2014 | - | - | 1/Apr/2016 | 30/Sep/2016 |
| MEMBER M | XYZ Company | DEVELOPMENT DEPT. | mm@xyz.com | 22/Aug/2014 | - | - | 1/Apr/2016 | 30/Sep/2016 |

COOPERATING APPLICATION

THERE IS ELECTRONIC MAIL TRANSMITTED AND RECEIVED BETWEEN MEMBERS A AND B WITHIN PERIOD FROM 1/Apr/2016 UP TO THE PRESENT DATE.

DATE OF TRANSMISSION AND RECEIPT : 8/Apr/2016

TITLE :　　PLAN FOR NEW PRODUCT

MEMBER B MAY HAVE BEEN TRANSFERRED TO THE SAME DEPARTMENT AS MEMBER A.
WOULD YOU LIKE TO UPDATE INFORMATION ABOUT MEMBER B?

B1　YES　　B2　NO

FIG. 9

CLIENT INFORMATION 14

| USER NAME | COMPANY NAME | DEPARTMENT | EMAIL ADDRESS | NEWLY REGISTERED DATE | DATE OF CHANGE | FORMER DEPARTMENT | PERIOD START DATE | PERIOD END DATE |
|---|---|---|---|---|---|---|---|---|
| MEMBER A | ABC Company | PLANNING DEPT. | aa@abc.com | 15/Apr/2013 | 28/Apr/2016 | DEVELOPMENT DEPT. | 1/Apr/2016 | 30/Sep/2016 |
| MEMBER B | ABC Company | PLANNING DEPT. | bb@abc.com | 1/May/2014 | 28/Apr/2016 | DEVELOPMENT DEPT. | 1/Apr/2016 | 30/Sep/2016 |
| MEMBER C | ABC Company | DEVELOPMENT DEPT. | cc@abc.com | 23/Jun/2014 | - | - | 1/Apr/2016 | 30/Sep/2016 |
| MEMBER D | ABC Company | PLANNING DEPT. | dd@abc.com | 3/Aug/2014 | - | - | 1/Apr/2016 | 30/Sep/2016 |
| MEMBER E | ABC Company | SALES DEPT. | ee@abc.com | 21/Aug/2014 | - | - | 1/Apr/2016 | 30/Sep/2016 |
| MEMBER M | XYZ Company | DEVELOPMENT DEPT. | mm@xyz.com | 22/Aug/2014 | - | - | 1/Apr/2016 | 30/Sep/2016 |

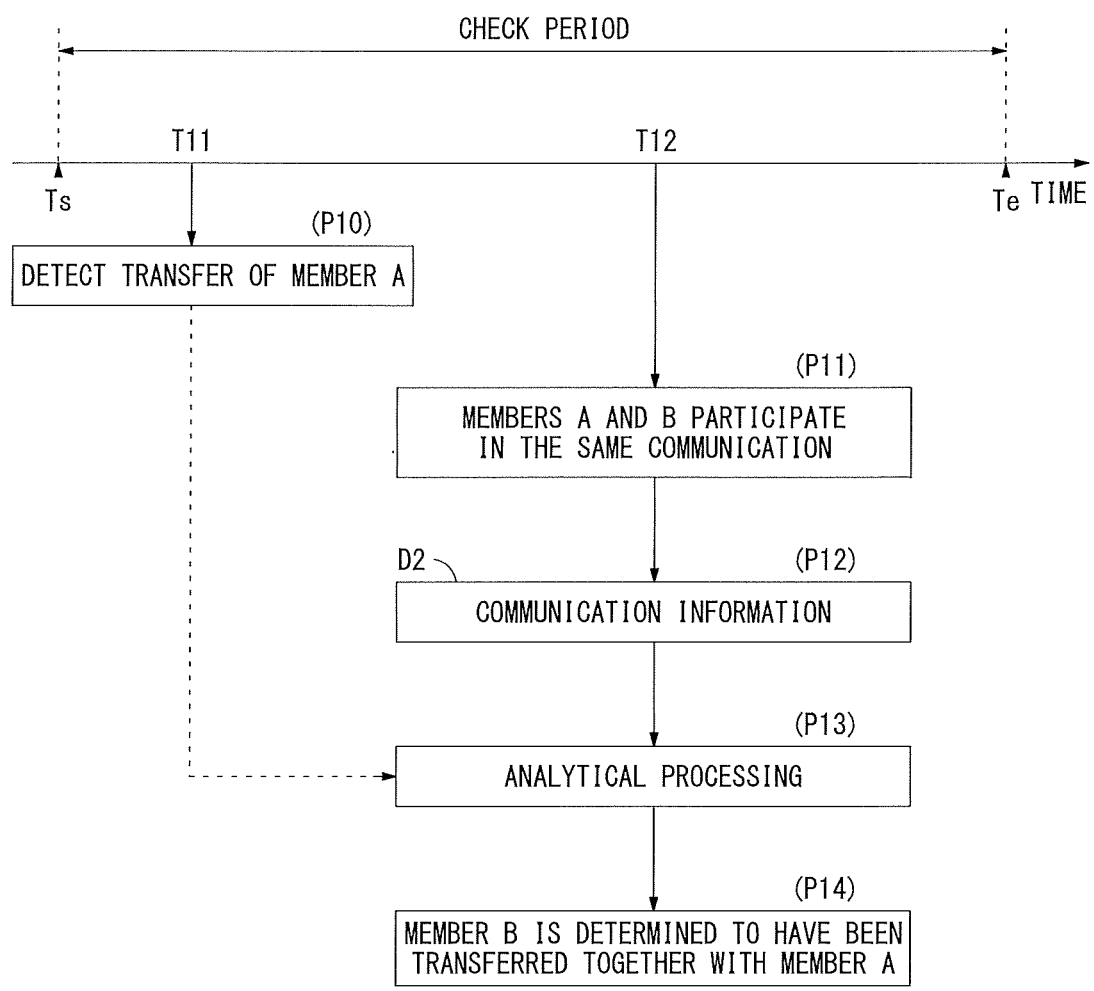

FIG. 11

CLIENT INFORMATION 14

| USER NAME | COMPANY NAME | DEPARTMENT | EMAIL ADDRESS | NEWLY REGISTERED DATE | DATE OF CHANGE | FORMER DEPARTMENT | PERIOD START DATE | PERIOD END DATE |
|---|---|---|---|---|---|---|---|---|
| MEMBER A | ABC Company | PLANNING DEPT. | aa@abc.com | 15/Apr/2013 | 28/Apr/2016 | DEVELOPMENT DEPT. | 1/Apr/2016 | 30/Sep/2016 |
| MEMBER B | ABC Company | PLANNING DEPT. | bb@abc.com | 1/May/2014 | 3/May/2016 | DEVELOPMENT DEPT. | 1/Apr/2016 | 30/Sep/2016 |
| MEMBER C | ABC Company | DEVELOPMENT DEPT. | cc@abc.com | 23/Jun/2014 | - | - | 1/Apr/2016 | 30/Sep/2016 |
| MEMBER D | ABC Company | PLANNING DEPT. | dd@abc.com | 3/Aug/2014 | - | - | 1/Apr/2016 | 30/Sep/2016 |
| MEMBER E | ABC Company | SALES DEPT. | ee@abc.com | 21/Aug/2014 | - | - | 1/Apr/2016 | 30/Sep/2016 |
| MEMBER M | XYZ Company | DEVELOPMENT DEPT. | mm@xyz.com | 22/Aug/2014 | - | - | 1/Apr/2016 | 30/Sep/2016 |

FIG. 13

CLIENT INFORMATION 14

| USER NAME | COMPANY NAME | DEPARTMENT | EMAIL ADDRESS | NEWLY REGISTERED DATE | DATE OF CHANGE | FORMER DEPARTMENT | PERIOD START DATE | PERIOD END DATE |
|---|---|---|---|---|---|---|---|---|
| MEMBER A | ABC Company | PLANNING DEPT. | aa@abc.com | 15/Apr/2013 | 28/Apr/2016 | DEVELOPMENT DEPT. | 1/Apr/2016 | 30/Sep/2016 |
| MEMBER B | ABC Company | DEVELOPMENT DEPT. | bb@abc.com | 1/May/2014 | - | - | 1/Apr/2016 | 30/Sep/2016 |
| MEMBER C | ABC Company | DEVELOPMENT DEPT. | cc@abc.com | 23/Jun/2014 | - | - | 1/Apr/2016 | 30/Sep/2016 |
| MEMBER D | ABC Company | DEVELOPMENT DEPT. | dd@abc.com | 3/Aug/2014 | 13/Apr/2016 | PLANNING DEPT. | 1/Apr/2016 | 30/Sep/2016 |
| MEMBER E | ABC Company | SALES DEPT. | ee@abc.com | 21/Aug/2014 | - | - | 1/Apr/2016 | 30/Sep/2016 |
| MEMBER M | XYZ Company | DEVELOPMENT DEPT. | mm@xyz.com | 22/Aug/2014 | - | - | 1/Apr/2016 | 30/Sep/2016 |

14a  14b  14c  14d  14e  14f  14g  14h  14i

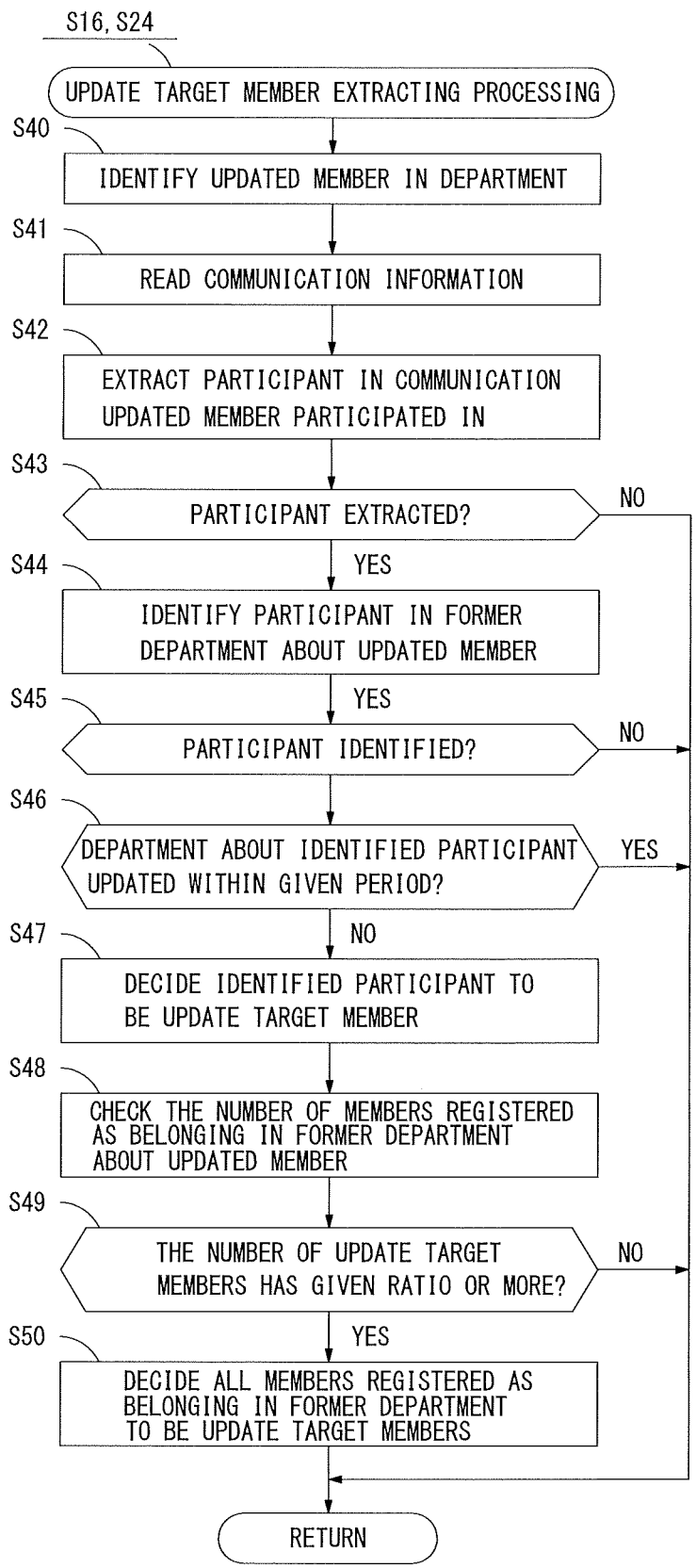

CLIENT INFORMATION MANAGEMENT APPARATUS AND NON-TRANSITORY RECORDING MEDIUM

Japanese patent application No. 2016-182669 filed on Sep. 20, 2016 including description, claims, drawings, and abstract the entire disclosure is incorporated herein by reference in its entirety.

BACKGROUND

Technological Field

The present invention relates to a client information management apparatus and a program, particularly to technology for changing information about a department where a client member belongs.

Description of the Related Art

According to a business card arrangement apparatus conventionally suggested (as described in Japanese Patent Application Laid-Open No. H10-143528 A (1998), for example), if business card data to be newly input by a user is to update existing data, all pieces of business card data containing a content matching a content in the existing data to be updated are extracted. Then, the user is asked to determine whether or not all of these pieces of business card data are to be updated collectively. If the user gives an instruction to make updates collectively, the business card arrangement apparatus updates all of the pieces of business card data containing the content matching the content in the existing data collectively. Such a conventional apparatus is useful if the name of a client company has been changed, for example.

However, the above-described conventional apparatus becomes less useful, for example if only some of a plurality of members belonging in a particular department of a client company have been transferred together to a different department. It is assumed, for example, that ten members belong in a development department and two of these members belong in a team for development of one product. In such a case, only the two in the same team out of the ten members in the development department may be transferred to a different department. In this case, all pieces of information about the ten members should not be updated collectively. Hence, according to the conventional apparatus, the user should be asked to make determinations one by one as to whether or not information about each of the ten members belonging in the development department is to be updated. This causes troublesome work for the user as the user is required to make instructions individually as to whether or not information about each of the ten members is to be updated.

SUMMARY

The present invention has been made to solve the above-described problem. The present invention is intended to provide a client information management apparatus and a program. In response to a change in a department about a member registered with client information, the client information management apparatus and the program achieve reduction in a work burden on a user by estimating a different member having been transferred to the same department as the member whose department has been changed together with this member.

First, the present invention is directed to a client information management apparatus.

To achieve at least one of the abovementioned objects, the client information management apparatus reflecting one aspect of the present invention comprises: a personal information receiver that accepts input of client personal information containing the name of a client member and a department where the client member belongs; a client information storage that stores client information containing information about a client member registered based on the client personal information accepted by the personal information receiver; a communication information storage that stores communication cumulative information containing accumulation of communication information about communication with the client member; and a hardware processor. The hardware processor performs: detecting a change in a department where one client member belongs and updating a department about the one client member in the client information if the member name in the client personal information accepted by the personal information receiver is the same as a member name about the one client member registered with the client information and if the department in the accepted client personal information differs from the department about the one client member registered with the client information; referring to the communication information accumulated in the communication cumulative information and extracting a member relating to the one client member as an update target member from different client members registered with the client information if the department about the one client member is updated; and updating a department about the update target member registered with the client information to the same department as the one client member.

Second, the present invention is directed to a non-transitory recording medium storing a computer readable program to be executed by a computer.

To achieve at least one of the abovementioned objects, the non-transitory recording medium reflecting one aspect of the present invention stores the computer readable program, execution of which by computer causing the computer to perform: accepting input of client personal information containing the name of a client member and a department where the client member belongs; managing client information containing information about the client member registered based on the accepted client personal information accepted; managing communication cumulative information containing accumulation of communication information about communication with the client member; detecting a change in a department where one client member belongs and updating a department about the one client member in the client information if the member name in the client personal information is the same as a member name about the one client member registered with the client information and if the department in the accepted client personal information differs from the department about the one client member; referring to the communication information accumulated in the communication cumulative information and extracting a member relating to the one client member as an update target member from different client members registered with the client information if the department about the one client member is updated; and updating a department about the update target member registered with the client information to the same department as the one client member.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 5 shows an example of client information;

FIG. 6 shows an example of the client information containing a change in a department about a member A;

FIG. 8 shows an example of an inquiry screen displayed on an information processing apparatus;

FIG. 9 shows an example of the client information containing an update on a department about a member B;

FIG. 10 shows a flow of processing to be performed by referring to future communication information;

FIG. 11 shows an example of the client information containing an update on the department about the member B made after the department about the member A is changed;

FIG. 13 shows an example of the client information indicating that a department about a member D has already been changed when the department about the member A is changed;

FIG. 16 is a flowchart showing an example of a procedure of update target member extracting processing in detail.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
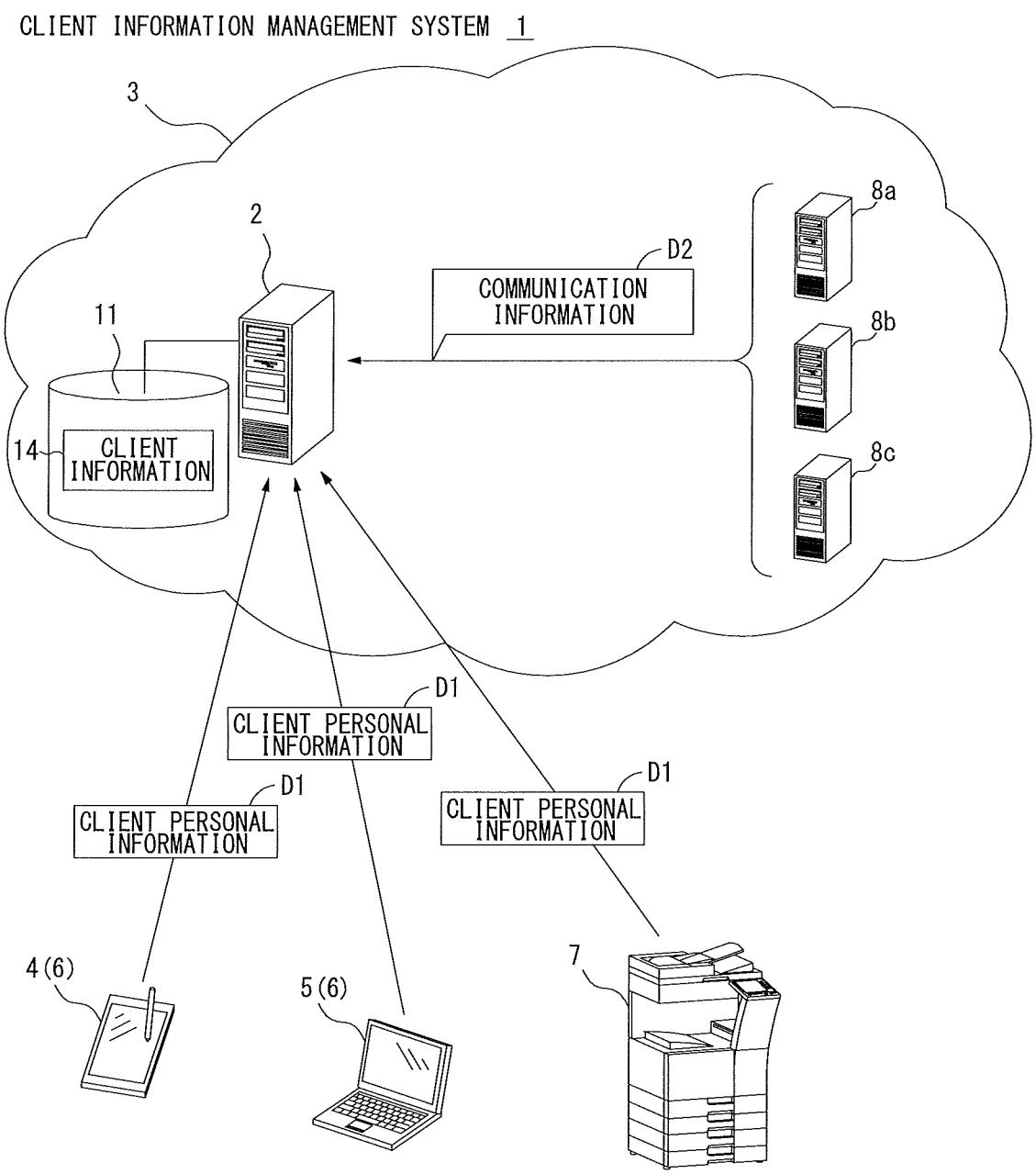
FIG. 1 shows an example of the configuration of a client information management system including a client information management apparatus.

FIG. 1 shows an example of the configuration of a client information management system 1 including a client information management apparatus 2 according to the present invention. The client information management system 1 includes: the client information management apparatus 2 formed of a general computer; information processing apparatuses 6 including a mobile terminal 4 such as a smartphone or a tablet terminal and a personal computer 5, for example; an image processing apparatus 7 with a scanning function formed of a multifunction peripheral (MFP), for example; a mail server 8a for transmission and receipt of electronic mails; a document server 8b storing document data such as data about minutes of meetings; and a web meeting server 8c that offers web meeting service. The client information management apparatus 2 is provided on an Internet network 3. The mail server 8a, the document server 8b, and the web meeting server 8c are also provided on the Internet network 3. Meanwhile, the information processing apparatuses 6 and the image processing apparatus 7 are installed in an office, for example. The information processing apparatuses 6 and the image processing apparatus 7 are configured to become capable of accessing the client information management apparatus 2 by accessing the Internet network 3 through a local area network in the office.

The client information management apparatus 2 is to store client information 14 containing accumulation of information about client members into a storage 11 and manage the stored client information 14 in the storage 11. If the client information management apparatus 2 acquires client personal information D1 uploaded from each information processing apparatus 6 and the image processing apparatus 7, the client information management apparatus 2 registers the acquired client personal information D1 with the client information 14. If the client information management apparatus 2 receives a request from the information processing apparatus 6 being used by a user to see the client information 14, for example, the client information management apparatus 2 provides this information processing apparatus 6 with the client information 14.

The information processing apparatus 6 includes an application installed in advance to make the information processing apparatus 6 operate in cooperation with the client information management apparatus 2. For example, this application has the function of starting a camera function of the information processing apparatus 6 and uploading image data generated by capturing an image of a business card to the client information management apparatus 2, for example. This application further has the function of uploading test information input by a user to the client information management apparatus 2. Thus, a user of the client information management apparatus 2 is allowed to upload image data generated by capturing an image of a business card of a client member to the client information management apparatus 2 as client personal information D1 by operating the information processing apparatus 6 of the user and starting the application. The user is also allowed to generate client personal information D1 and upload the generated client personal information D1 to the client information management apparatus 2 by operating the application and inputting a content in a business card of a client member in a text format.

In addition to the above-described functions, the application installed on the information processing apparatus 6 has the function of receiving a notification from the client information management apparatus 2 and displaying the received notification on a display, for example. This application further has the function of accessing the client information management apparatus 2 and displaying the content of the client information 14 for viewing, for example.

The image processing apparatus 7 is capable of reading a business card of a client member by using the scanning function and generating image data to become client personal information D1. If the image processing apparatus 7 reads a business card of a client member, the image processing apparatus 7 uploads image data about the business card to the client information management apparatus 2 as client personal information D1.

In the above-described client information management system 1, if a user of the client information management apparatus 2 exchanges business cards with a client member, the user uploads client personal information D1 based on the business card of the client member to the client information management apparatus 2 through the information processing apparatus 6 or the image processing apparatus 7. If the client personal information D1 received by the client information management apparatus 2 is new information not registered with the client information 14, the client information management apparatus 2 accumulates and stores the received client personal information D1 in the client information 14. In contrast, if the client personal information D1 received from the information processing apparatus 6 or the image processing apparatus 7 is information about the same client member as client personal information D1 already registered with the client information 14, the client information management apparatus 2 determines whether or not a department where this client member belongs has been changed. If a department where this client member belongs has been changed, the client information management apparatus 2 updates a department about this client member registered with the client information 14.

The mail server 8a stores electronic mails transmitted and received to and from various members including client members. Such electronic mails correspond to one type of communication information D2 containing a communication having been made with a client member. By referring to a destination address or a source address of an electronic mail, a counterpart of a communication having been made through this electronic mail can be understood.

The document server 8b stores minutes of meetings various members including client members participated in. Such minutes of meetings also correspond to one type of communication information D2 containing a communication having been made with a client member. By referring to a list of participants in the minutes of a meeting, a counterpart of a communication having been made through the meeting can be understood.

The web meeting server 8c stores history information about web meetings various members including client members participated in. The web meeting server 8c further stores reservation information about web meetings various members plan to participate in. Such history information and such reservation information also correspond to one type of communication information D2 containing a communication having been made with a client member. By referring to a list of participants in the history information or in the reservation information, participants in a communication having been made through a web meeting can be understood.

The client information management apparatus 2 accesses each of the mail server 8a, the document server 8b, and the web meeting server 8c regularly to collect communication information D2. Specifically, the communication information D2 contains an electronic mail, the minutes of a meeting, and history information or reservation information about a web meeting. The client information management apparatus 2 stores and manages the communication information D2 collected from the mail server 8a, etc. in the storage 11.

If the client information management apparatus 2 updates a department about one client member registered with the client information 14, the client information management apparatus 2 refers to communication information D2 accumulated in the storage 11 to extract a different member as an update target member estimated to engage in a job in the same team as the one client member whose department has been changed. Specifically, if a plurality of client members belonging in the same department of a client company engages in the same job, it is highly likely that these client members will be transferred together to a different department. Thus, if the client information management apparatus 2 determines that one of a plurality of members engaging in a job in the same team has been transferred to a different department, the client information management apparatus 2 makes an estimation that a different one of the members has been transferred to the same department, and extracts the estimated different member as an update target member. The client information management apparatus 2 is also configured to identify a member different from the member determined to have been transferred to the different department and participating in the same communication as the member determined to be in the different department by referring to the communication information D2, and extract the identified different member as an update target member. The client information management apparatus 2 operating in this way will be described in more detail below.

Figure 2:
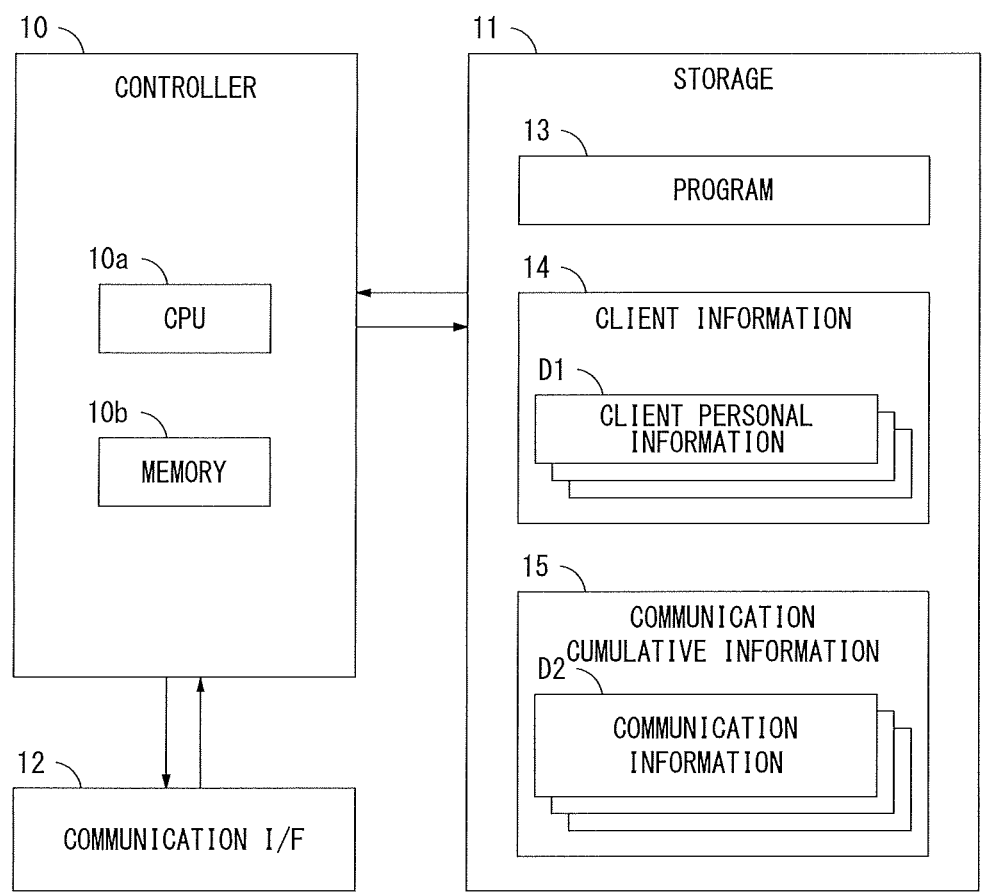
FIG. 2 is a block diagram showing an example of the hardware configuration of the client information management apparatus.

FIG. 2 is a block diagram showing an example of the hardware configuration of the client information management apparatus 2. The client information management apparatus 2 includes a controller 10, the storage 11, and a communication interface 12. The controller 10 is a computing unit including a CPU 10a and a memory 10b. The controller 10 controls the storage 11 and the communication interface 12. The storage 11 is formed of a nonvolatile storage device such as a hard disk drive (HDD), for example. The storage 11 stores a program 13 to be executed by the CPU 10a of the controller 10, the client information 14 containing accumulation of client personal information D1, and communication cumulative information 15 containing accumulation of communication information D2. The communication interface 12 is used for communication between the controller 10 and a different unit.

At the start of the client information management apparatus 2, the CPU 10a of the controller 10 reads the program 13 and executes the read program 13, thereby making the controller 10 function as a crawler 20 and a client information manager 30.

Figure 3:
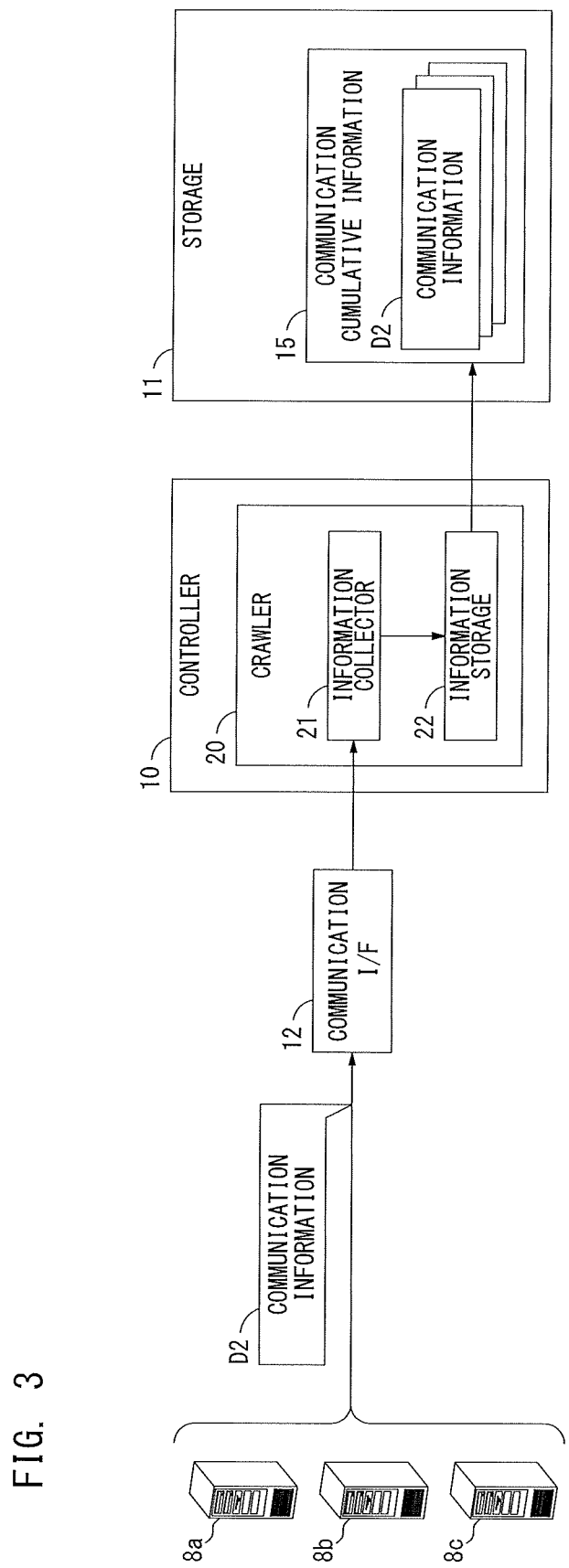
FIG. 3 is a functional block diagram including a controller functioning as a crawler.

FIG. 3 is a functional block diagram including the controller 10 functioning as the crawler 20. The crawler 20 is a processor that comes into operation regularly in the controller 10, for example. The crawler 20 collects communication information D2 from each of the mail server 8a, the document server 8b, and the web meeting server 8c. As shown in FIG. 3, the crawler 20 includes an information collector 21 and an information storage 22. The information collector 21 regularly accesses each of the mail server 8a, the document server 8b, and the web meeting server 8c through the communication interface 12 to collect communication information D2 from each of the servers 8a, 8b, and 8c. The information collector 21 may collect only the communication information D2 newly added and not existing at the time of last collection from each of the servers 8a, 8b, and 8c. If the information collector 21 acquires the communication information D2, the information storage 22 stores the acquired communication information D2 into the storage 11 as a new entry. In this way, new communication information D2 is added regularly to the communication cumulative information 15 in the storage 11.

Figure 4:
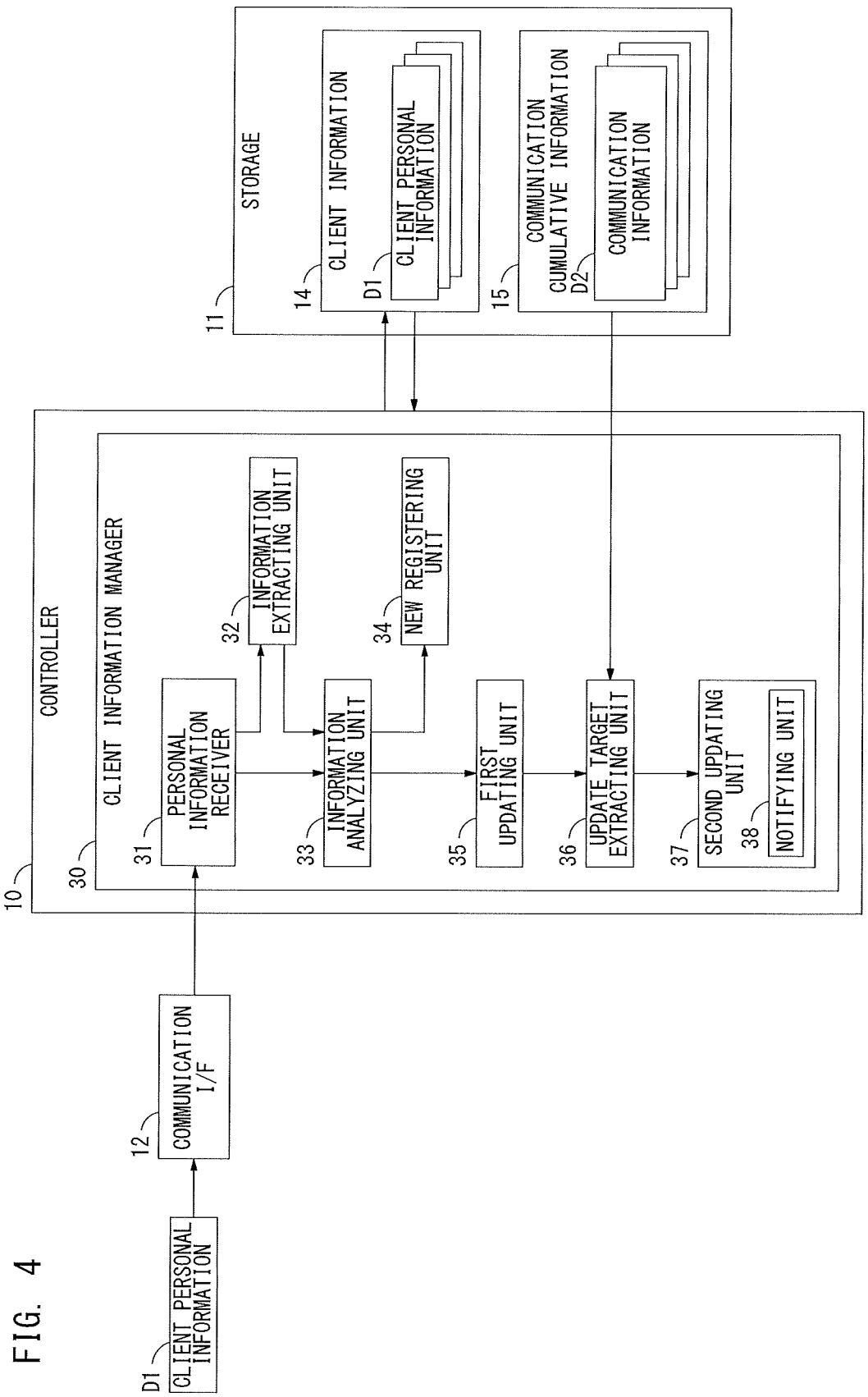
FIG. 4 is a functional block diagram including the controller functioning as a client information manager.

FIG. 4 is a functional block diagram including the controller 10 functioning as the client information manager 30. The client information manager 30 is resident in the controller 10. The client information manager 30 starts operating in response to receipt of client personal information D1 uploaded from the information processing apparatus 6 or the image processing apparatus 7. The client information manager 30 functions as a personal information receiver 31, an information extracting unit 32, an information analyzing unit 33, a new registering unit 34, a first updating unit 35, an update target extracting unit 36, and a second updating unit 37.

The personal information receiver 31 is a processor that accepts input of client personal information D1 received by the communication interface 12. The client personal information D1 input to the personal information receiver 31 contains information about a client member such as a member name, a company name, a department, and an electronic mail address, for example. These pieces of information are contained in image data or text data. If the client personal information D1 is image data, the personal information receiver 31 outputs the client personal information D1 received by the communication interface 12 to the information extracting unit 32. If the client personal information D1 is text data, the personal information receiver 31 outputs the client personal information D1 received by the communication interface 12 to the information analyzing unit 33.

If the client personal information D1 is acquired as image data, the information extracting unit 32 performs character recognition processing such as optical character recognition (OCR) or intelligent character recognition (ICR) on the acquired image data to convert information about the client member in the client personal information D1 such as a company name, a department, a member name, and an electronic mail address to text data. Then, the information extracting unit 32 outputs the client personal information D1 converted to the text data to the information analyzing unit 33.

The information analyzing unit 33 analyzes the client personal information D1 to determine whether or not a client member corresponding to the analyzed client personal information D1 is registered with the client information 14. Specifically, the information analyzing unit 33 reads the client information 14 from the storage 11 and compares client personal information D1 registered with the client information 14 with the client personal information D1 currently received, thereby determining whether or not client personal information D1 about the same client member is already registered with the client information 14. If information matching the company name and the member name in the currently received client personal information D1 is already registered with the client information 14, for example, the information analyzing unit 33 determines that information about the same client member is already registered with the client information 14. In this case, the information analyzing unit 33 operates the first updating unit 35. In contrast, if the client information 14 does not contain information matching the company name and the member name in the currently received client personal information D1, the information analyzing unit 33 determines that the currently received client personal information D1 is information to be registered newly. In this case, the information analyzing unit 33 operates the new registering unit 34.

If the currently received client personal information D1 is about a new client member, the new registering unit 34 registers this client personal information D1 as a new entry with the client information 14. Meanwhile, if the currently received client personal information D1 is not about a new client member, the new registering unit 34 is not operated. As a result, information about the same client member will not be registered repeatedly with the client information 14.

FIG. 5 shows an example of the client information 14. As shown in FIG. 5, the following pieces of information about each client member are registered with the client information 14: a member name 14a, a company name 14b, a department 14c, an electronic mail address 14d, and a newly registered date 14e. The following pieces of information about each client member can also be registered with the client information 14: a date of change 14f, a former department 14g, a period start date 14h, and a period end date 14i.

The newly registered date 14e is information indicating a date when information about a client member is newly registered with the client information 14. The newly registered date 14e will not be changed. The date of change 14f is information to be recorded on the occurrence of a change in the department 14c about the client member and indicating a date of the change. The field of the date of change 14f is blank when information about the client member is newly registered. The former department 14g is information to be recorded on the occurrence of a change in the department 14c about the client member and indicating a former department about the client member. The field of the former department 14g is also blank when information about the client member is newly registered.

The period start date 14h is information indicating the beginning of a check period for communication information D2 accumulated in the communication cumulative information 15. The period end date 14i is information indicating the end of the check period for the communication information D2 accumulated in the communication cumulative information 15. This check period is set by an administrator of the client information management apparatus 2 at any of the following periods: a one-year period, a half-year period, and a quarterly period. In many cases, personnel transfers are generally made for every one-year period, every half-year period, or every quarterly period. Thus, by setting the check period at any of a one-year period, a half-year period, and a quarterly period, the transfers of a plurality of members engaging in the same job can be detected accurately. Meanwhile, the check period is not always required to be any of a one-year period, a half-year period, and a quarterly period but it can be a period set freely by the administrator.

In this preferred embodiment, the client information 14 shown in FIG. 5 is in an initial state. The following description proceeds by explaining an exemplary case where the transfer of a client member occurs from the initial state of FIG. 5.

The first updating unit 35 is operated if information about a client member corresponding to currently received client personal information D1 is already registered with the client information 14. If acquired client personal information D1 is about a client member already registered with the client information 14, the first updating unit 35 determines whether or not this client member has been transferred to a different department. Specifically, the first updating unit 35 determines whether or not a department in the acquired client personal information D1 is the same as the department 14c about the same client member registered with the client information 14. If these departments are the same, the first updating unit 35 determines that this client member has not been transferred to a different department. In this case, the first updating unit 35 does not update the client information 14.

In contrast, if the department in the client personal information D1 differs from the department 14c about the same client member registered with the client information 14, the first updating unit 35 determines that this client member has been transferred so the department about this client member has been changed. If the first updating unit 35 detects the change in the department, the first updating unit 35 changes the department 14c about this client member registered with the client information 14 to the department in the currently received client personal information D1. For example, if the first updating unit 35 determines that the department 14c about the member A shown in FIG. 5 has been changed from a "development department" to a "planning department," the first updating unit 35 changes the department 14c about the member A to the "planning department," as shown in FIG. 6. In response to this change, the first updating unit 35 records the "development department" into the field of the former department 14g about the member A indicating a department where the member A belonged formerly. Further, the first updating unit 35 records a date of detection of the change in the department into the field of the date of change 14f about the member A. As described above, the first updating unit 35 is configured in such a manner that, if the first updating unit 35 detects the change in a department where the client member belongs based on the currently received client personal information D1, the first updating unit 35 changes the department 14c about this client member registered with the client information 14, and records the former department 14g and the date of change 14f about this client member to store a change history.

The update target extracting unit 36 is operated by the change made by the first updating unit 35 in the department 14c about the client member registered with the client information 14. The update target extracting unit 36 performs processing of extracting a client member as an update target member different from and relating to the client member whose department 14c has been changed. This different client member to be extracted is a member who can be estimated to belong in the former department 14g about the client member whose department 14c has been changed and to engage in the same job as the client member whose department 14c has been changed. A determination as to whether or not the different client member belongs in the framer department 14g about the client member whose department 14c has been changed can be made by referring to the client information 14. Meanwhile, a determination as to whether or not the different client member engages in the same job as the client member whose department 14c has been changed cannot be made by referring to the client information 14. Thus, the update target extracting unit 36 refers to communication information D2 accumulated in the communication cumulative information 15 to determine whether or not the different client member participates in the same communication as the client member whose department 14c has been changed. Specifically, if the different client member participates in the same communication as the client member whose department 14c has been changed, the update target extracting unit 36 determines that the different client member is highly likely to engage in the same job.

If this determination is to be made by referring to electronic mails accumulated in the communication cumulative information 15, for example, the update target extracting unit 36 extracts an electronic mail from the communication cumulative information 15. The extracted electronic mail contains an electronic mail address of the client member whose department 14c has been changed recorded as a destination address or a source address. Then, based on a different electronic mail address listed as a destination address or a source address of the extracted electronic mail, the update target extracting unit 36 extracts the different client member engaging in the same job as the client member whose department 14c has been changed.

If the above-described determination is to be made by referring to the minutes of meetings accumulated in the communication cumulative information 15, for example, the update target extracting unit 36 extracts the minutes of a meeting from the communication cumulative information 15. The extracted minutes contain the client member recorded as a participant whose department 14c has been changed. Then, based on information about a different participant recorded in the extracted minutes of the meeting, the update target extracting unit 36 extracts the different client member engaging in the same job as the client member whose department 14c has been changed.

If the above-described determination is to be made by referring to history information or reservation information about web meetings accumulated in the communication cumulative information 15, for example, the update target extracting unit 36 extracts history information or reservation information from the communication cumulative information 15. The extracted history information or reservation information contains the client member recorded as a participant whose department 14c has been changed. Then, based on information about a different participant recorded in the extracted history information or reservation information, the update target extracting unit 36 extracts the different client member engaging in the same job as the client member whose department 14c has been changed.

Meanwhile, if old communication information D2 retained for a fixed period or more has a record indicating that the different client member participated in the same communication as the client member whose department 14c has been changed, the different client member does not always engage in the same job at present as the client member whose department 14c has been changed. Specifically, as communication information D2 to be referred to by the update target extracting unit 36 gets older, the different client member is considered to be less likely to engage in the same job as the client member whose department 14c has been changed. Then, the update target extracting unit 36 determines whether or not the different client member engages in the same job as the client member whose department 14c has been changed within a check period determined based on the period start date 14h and the period end date 14i recorded in the client information 14. This makes it less likely that reliability of the determination as to doing the same job will be reduced.

If the period start date 14h has already been passed at the time when the first updating unit 35 changes the department 14c about a client member registered with the client information 14, a check period covers a past period before the time of the change in the department 14c about the client member. In this case, when the department 14c about the client member is changed, the update target extracting unit 36 is allowed to immediately refer to communication information D2 accumulated in the past within the previous check period. Thus, by referring to the past communication information D2 within the check period at the time when the first updating unit 35 changes the department 14c about the client member, the update target extracting unit 36 immediately extracts an update target member.

Figure 7:
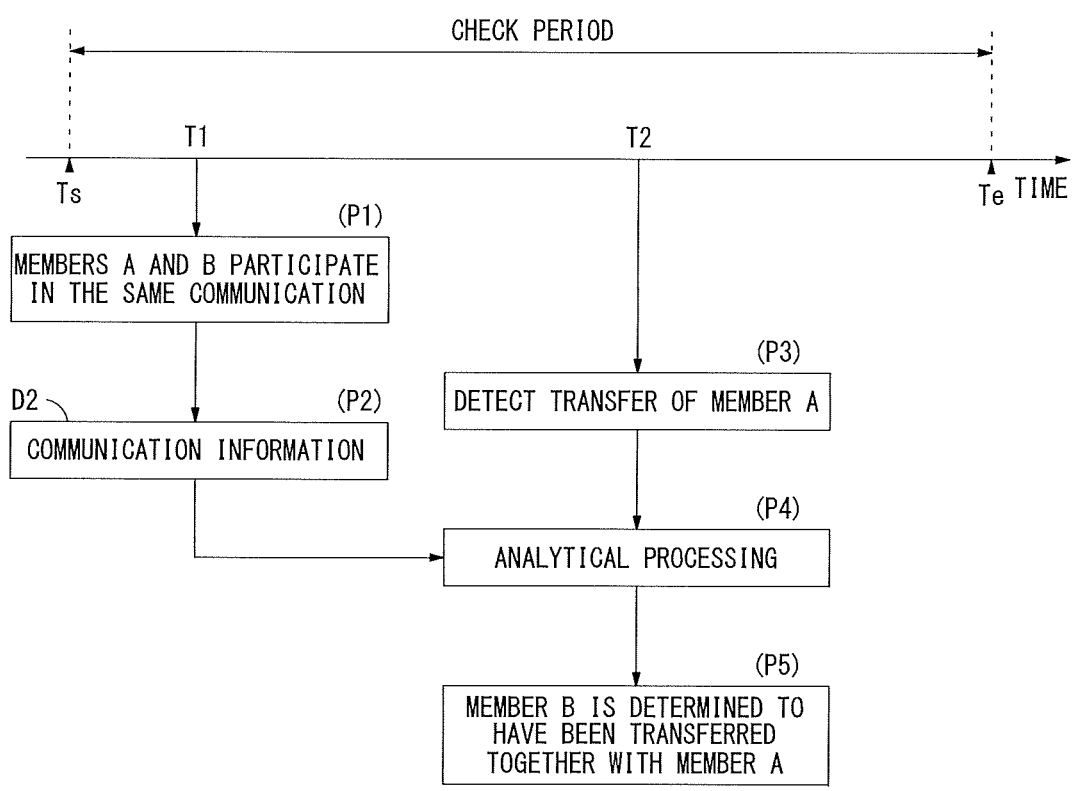
FIG. 7 is a flow of processing to be performed by referring to past communication information.

FIG. 7 is a flow of processing to be performed by referring to past communication information D2. In the illustration of FIG. 7, a check period starts at a time point Ts and ends at a time point Te. In the illustration of FIG. 7, the member A and a member B shown in FIG. 5 participate in the same communication at a time point T1. The members A and B both belong in the "development department" at the time point T1. This communication may be a communication made through transmission and receipt of electronic mails containing each of the electronic mail addresses of the members A and B as a destination address or a source address. Alternatively, this communication may be a communication made through participation of the members A and B in the same meeting. Still alternatively, this communication may be a communication made through participation of the members A and B in the same web meeting.

If the members A and B participate in the same communication at the time point T1 (process P1), communication information D2 resulting from the participation is generated (process P2). The member A is thereafter transferred from the "development department" to the "planning department". If client personal information D1 about the member A is input thereafter at a time point T2, the first updating unit 35 detects the transfer of the member A (process P3). In response to this detection, the update target extracting unit 36 performs analytical processing (process P4). In this process, the update target extracting unit 36 refers to the communication information D2 to determine that the members A and B participated in the same communication at the time point T1 within the check period. Further, the member B can be determined to belong in the former department 14g about the member A by referring to the client information 14. Thus, the update target extracting unit 36 makes an estimation that the member B engages in the same job in the same team as the member A. Then, the update target extracting unit 36 determines that the member B having belonged in the former department 14g about the member A has been transferred to the same department as the member A together with the member A (process P5). In this way, the update target extracting unit 36 extracts the member B as a target member of update accompanying the transfer of the member A.

If an update target member is extracted by the following processing, the second updating unit 37 is operated next. The second updating unit 37 changes the department 14c about the update target member extracted by the update target extracting unit 36 to the same department 14c as the client member updated by the first updating unit 35, thereby updating the client information 14. If the member B is extracted as the update target member as described above, for example, the second updating unit 37 changes the department 14c about the member B in the client information 14 from the "development department" to the same department 14c as the member A, the "planning department," thereby updating the client information 14.

The second updating unit 37 includes a notifying unit 38. The notifying unit 38 is a processor that operates as follows. Before the second updating unit 37 changes the department 14c about an update target member, the notifying unit 38 transmits a notification to a user (information input user) having input client personal information D1 based on which the update target member has been extracted. This notification is to ask the user to determine whether or not the department 14c about the update target member is to be changed. Then, the notifying unit 38 accepts an instruction from the user. The notifying unit 38 transmits the inquiry as to whether or not the department 14c about the update target member is to be changed by transmitting a push notification to the application on the information processing apparatus 6 used by the information input user. As a result, a screen used for the inquiry as to whether or not the department 14c about the update target member is to be changed is displayed on the information processing apparatus 6 used by the information input user.

FIG. 8 shows an example of an inquiry screen G1 displayed on the information processing apparatus 6. The screen G1 is an example of a screen used for an inquiry as to whether or not the department 14c about the member B is to be changed in response to a change having been made in the department 14c about the member A. A lower part of the displayed screen G1 contains two buttons, a button B1 and a button B2 to be operated by an information input user. The button B1 is operated by the information input user for instructing a change in the department 14c about the member B. The button B2 is operated by the information input user if the information input user does not intend to change the department 14c about the member B. If the application on the information processing apparatus 6 detects operation by the information input user, the application transmits information based on from the operation to the client information management apparatus 2.

If the notifying unit 38 receives an instruction to change the department 14c about an update target member input by the information input user, the notifying unit 38 allows the second updating unit 37 to change the department 14c about the update target member. In contrast, if the notifying unit 38 does not receive an instruction to change the department 14c about the update target member, the notifying unit 38 prohibits the second updating unit 37 to change the department 14c about the update target member. In this way, the second updating unit 37 changes the department 14c about the update target member based on a result of the inquiry made to the information input user by the notifying unit 38. In many cases, the information input user generally acquires information about the transfer of a client member during exchange of business cards with this client member. If this client member has been transferred to a different department together with a different client member, the information input user might acquire information about the transfer of the different client member. Thus, by making the inquiry to the information input user, the notifying unit 38 is allowed to register the department 14c correctly with the client information 14.

Alternatively, the second updating unit 37 may update the department 14c about an update target member automatically without making the inquiry to the information input user.

FIG. 9 shows an example of the client information 14 containing an update on the department 14c about the member B made by the second updating unit 37. If the update target extracting unit 36 extracts the member B as an update target member in response to a change in the department 14c about the member A from the "development department" to the "planning department" made by the first updating unit 35, the second updating unit 37 changes the department 14c about the member B to the same department 14c as the member A, the "planning department," as shown in FIG. 9. In response to this change, the second updating unit 37 records the "development department" into the field of the former department 14g about the member B indicating a former department where the member B belonged formerly. Further, the second updating unit 37 records a date of the change in the department 14c into the field of the date of change 14f about the member B. As a result, the client information 14 shown in FIG. 6 is updated to the client information 14 shown in FIG. 9. As described above, the second updating unit 37 is configured in such a manner that, if the second updating unit 37 changes the department 14c about an update target member registered with the client information 14, the second updating unit 37 records the former department 14g and the date of change 14f about the update target member to store a change history.

If the period end date 14i has not come at the time when the first updating unit 35 changes the department 14c about a client member registered with the client information 14, a check period covers a future period after the time of the change in the department 14c about the client member. In this case, the update target extracting unit 36 is allowed to refer to future communication information D2 to be accumulated in the communication cumulative information 15 until the end of the check period after the department 14c about the client member is changed. Thus, after the first updating unit 35 changes the department 14c about the client member, the update target extracting unit 36 can also extract an update target member by referring to communication information D2 to be newly accumulated in the communication cumulative information 15 until the end of the check period.

FIG. 10 is a flow of processing to be performed by referring to future communication information D2. In the illustration of FIG. 10, a check period starts at the time point Ts and ends at the time point Te. In the illustration of FIG. 10, the member A is assumed to be transferred from the "development department" to the "planning department" before a time point T11. If client personal information D1 about the member A is input at the time point T11, the first updating unit 35 detects the transfer of the member A (process P10). At this time, if communication information D2 accumulated past within the check period until the time point T11 does not contain information indicating participation of the members A and B in the same communication, the member B is not extracted as an update target member. Thus, in this case, the department 14c about the member B is not changed.

If the members A and B participate in the same communication at a subsequent time point T12 (process P11), new communication information D21 resulting from this participation is generated (process P12). Like in the above-described case, this communication may be any one of the following communications: a communication made through transmission and receipt of electronic mails involving the members A and B; a communication made through participation of the members A and B in the same meeting; and a communication made through participation of the members A and B in the same web meeting.

If the new communication information D2 is generated, the update target extracting unit 36 performs analytical processing (process P13). In this process, the update target extracting unit 36 refers to the newly accumulated communication information D2 to determine that the members A and B participated in the same communication at the time point T12 within the check period. Further, the member B can be determined to belong in the former department 14g about the member A by referring to the client information 14. Thus, the update target extracting unit 36 makes an estimation that the member B engages in the same job in the same team as the member A. Then, the update target extracting unit 36 determines that the member B having belonged in the former department 14g about the member A has been transferred to the same department as the member A together with the member A (process P14). In this way, the update target extracting unit 36 is allowed extract the member B as a target member of update accompanying the transfer of the member A after the department 14c about the member A is changed.

If the update target member is extracted after the department 14c about the member A is changed by the following processing, the second updating unit 37 is also operated next. The second updating unit 37 changes the department 14c about the update target member extracted by the update target extracting unit 36 to the same department 14c as the client member updated by the first updating unit 35, thereby updating the client information 14. If the member B is extracted as the update target member as described above, for example, the second updating unit 37 changes the department 14c about the member B in the client information 14 from the "development department" to the same department 14c as the member A, the "planning department," thereby updating the client information 14. At this time point, the notifying unit 38 of the second updating unit 37 may also be operated to transmit an inquiry as to whether or not the department 14c about the member B is to be changed to an information input user having input the client personal information D1 at the time point T11.

FIG. 11 shows an example of the client information 14 containing an update on the department 14c about the member B made by the second updating unit 37 after the department 14c about the member A is changed. If the update target extracting unit 36 extracts the member B as an update target member by the end of the check period after the first updating unit 35 changes the department 14c about the client member A from the "development department" to the "planning department," the second updating unit 37 changes the department 14c about the member B to the same department 14c as the member A, the "planning department" at a time of the extraction of the member B, as shown in FIG. 11. In response to this change, the second updating unit 37 records the "development department" into the field of the former department 14g about the member B indicating a former department where the member B belonged formerly. Further, the second updating unit 37 records a date of the change in the department 14c into the field of the date of change 14f about the member B. The date recorded at this time into the field of the date of change 14f about the member B is a date after the date of change 14f about the member A. As a result, the client information 14 shown in FIG. 6 is updated to the client information 14 shown in FIG. 11.

It is assumed that the update target extracting unit 36 checks communication information D2 within the check period to find that there is only one communication information D2 indicating participation of the members A and B in the same communication. In this case, if the member B is determined to have been transferred to the same department as the member A together with the member A based only on this communication information D2, this determination might become an erroneous determination. It is assumed, for example, that the member B participated in the same communication as the member A together with the member A only once before the transfer of the member A for the purpose of handover of a job from the member A to the member B. In this case, the member B is to do the job in place of the member A after the transfer of the member A. Thus, a determination that the member B has been transferred to the same department as the member A together with the member A is incorrect.

To prevent such an erroneous determination, the update target extracting unit 36 may decide an update target member for and extract the update target member based on communication information D2 on condition of extraction of multiple pieces of communication information D2 indicating participation in the same communication by the update target member and a client member whose department 14c has been updated. In this case, if only one communication information D2 indicating participation in the same communication by the update target member and the client member whose department 14c has been updated is extracted within the check period, for example, a data reference period still before the period start date 14h of the check period may be used retroactively. Then, communication information D2 indicating participation in the same communication by the update target member and the client member whose department 14c has been updated may be extracted from the data reference period.

Figure 12:
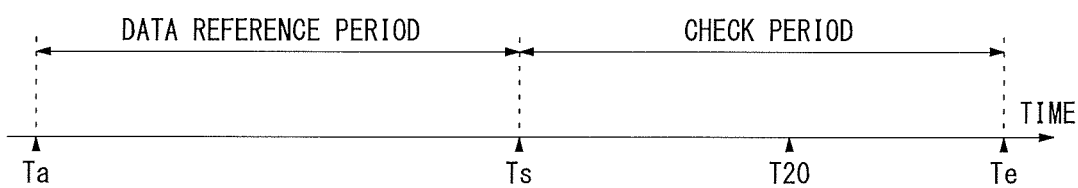
FIG. 12 shows a relationship between a check period and a data reference period.

FIG. 12 shows a relationship between the check period and the data reference period. As shown in FIG. 12, the data reference period is set to come before the check period. The data reference period is from a time point Ta to the time point Ts corresponding to the beginning of the check period. If the client information management apparatus 2 determines that a department where the member A belongs has been changed based on client personal information D1 received at a time point T20 within the check period, the client information management apparatus 2 updates the department 14c about the member A in the client information 14 at the time point T20. At this time, it is assumed that the update target extracting unit 36 extracts one communication information D2 indicating participation of the member B in the same communication as the member A together with the member A by referring to communication information D2 accumulated within a period from the time point Ts to the time point T20. In this case, the update target extracting unit 36 further refers to communication information D2 accumulated in the data reference period before the check period to determine whether or not there is at least one communication information D2 indicating participation of the member B in the same communication as the member A together with the member A. If at least one communication information D2 indicating participation of the member B in the same communication as the member A together with the member A can be extracted from the data reference period, the update target extracting unit 36 is allowed to determine that the member B is doing the same job as the member A continuously together with the member A before and after the time point Ts. In this way, this participation by the member B can be discriminated from temporal participation in a communication merely for the purpose of job handover. As a result, the update target extracting unit 36 is allowed to determine more correctly that the member B has been transferred to a different department together with the member A.

Processing similar to the above-described processing can be applied to a future period from the time point T20 to the end of the check period. Specifically, it is assumed that the update target extracting unit 36 extracts one communication information D2 indicating participation of the member B in the same communication as the member A together with the member A by referring to communication information D2 newly accumulated within the period from the time point T20 to the time point Te. In this case, the update target extracting unit 36 also refers to communication information D2 accumulated in the data reference period before the check period to determine whether or not there is at least one communication information D2 indicating participation of the member B in the same communication as the member A together with the member A. If at least one communication information D2 indicating participation of the member B in the same communication as the member A together with the member A can be extracted from the data reference period, the update target extracting unit 36 is allowed to determine that the member B is doing the same job as the member A continuously together with the member A over a long period of time. As a result, the update target extracting unit 36 is allowed to determine that the member B has been transferred to a different department together with the member A.

If one communication information D2 extracted from the check period contains a different member recorded as a participant except the members A and B, the update target extracting unit 36 may determine that the member B has been transferred to a different department together with the member A on condition of extraction of different communication information D2 from the check period or the data reference period. The different communication information D2 to be extracted indicates that all participants including the different member are the same as those in the one communication information D2 extracted from the check period. By setting the condition to be satisfied if all participants in communications are the same members, it can be determined still more correctly that the member B is doing the same job as the member A continuously. This provides enhanced reliability to a determination that the member B has been transferred to a different department together with the member A.

It is preferable that, during extraction of an update target member, the update target extracting unit 36 will not extract a client member as an update target member whose department 14c has been changed by the first updating unit 35 within the check period. The reason for this is as follows. The client member whose department 14c has been updated by the first updating unit 35 within the check period is a member whose department 14c has been changed based on newest client personal information D1 input from the information processing apparatus 6 or the image processing apparatus 7. Thus, if the department 14c about the client member has been changed by the first updating unit 35 within the check period, information about this client member can be considered to have already been updated to newest information. By excluding such a client member from an update target member, newest information can be retained as it is in the client information 14 without being rewritten.

FIG. 13 shows an example of the client information 14 indicating that the department 14c about a member D has already been changed when the department 14c about the member A is changed. For example, it assumed that, in response to the change in the department 14c about the member A, the update target extracting unit 36 detects participation of the members A and D in the same communication by referring to communication information D2. In this case, the member D is extracted as an update target member by employing the above-described usual processing as the member D belongs in the former department 14g about the member A, the "development department." However, the department 14c about the member D was updated before the update on the department 14c about the member A. Thus, even if the member D participates in the same communication as the member A, the update target extracting unit 36 does not extract the member D as an update target member. This prevents the department 14c about the member D from being rewritten inadvertently to a department where the member D belonged formerly.

The client information 14 may contain a plurality of client members registered as belonging in the same department 14c as a client member belonged formerly whose department 14c has been updated. Further, the update target extracting unit 36 may extract members of a given ratio or more (of a given number or more) as update target members from the plurality of client members by referring to communication information D2. For example, if the client information 14 contains 10 members except the member A and registered as belonging in the former department 14g about the member A, the "development department," the update target extracting unit 36 may extract eight as update targets from the ten registered members. Like in this case, if a given number of client members having a given ratio or more are extracted as update target members from a plurality of client members belonging in the same department, the name of this department is very likely to have been changed by a change in organization of a company the client members work for. Thus, if the update target extracting unit 36 extracts a given number of client members having a given ratio or more as update target members from a plurality of client members belonging in the same department, the update target extracting unit 36 preferably extract all these client members belonging in the same department as update target members. By doing so, if the name of a department where client members belong is determined to have been changed by a change in organization of a company these client members work for, the departments 14c about all of these client members belonging in the same department can be updated collectively. This prevents omission of update.

Figure 14:
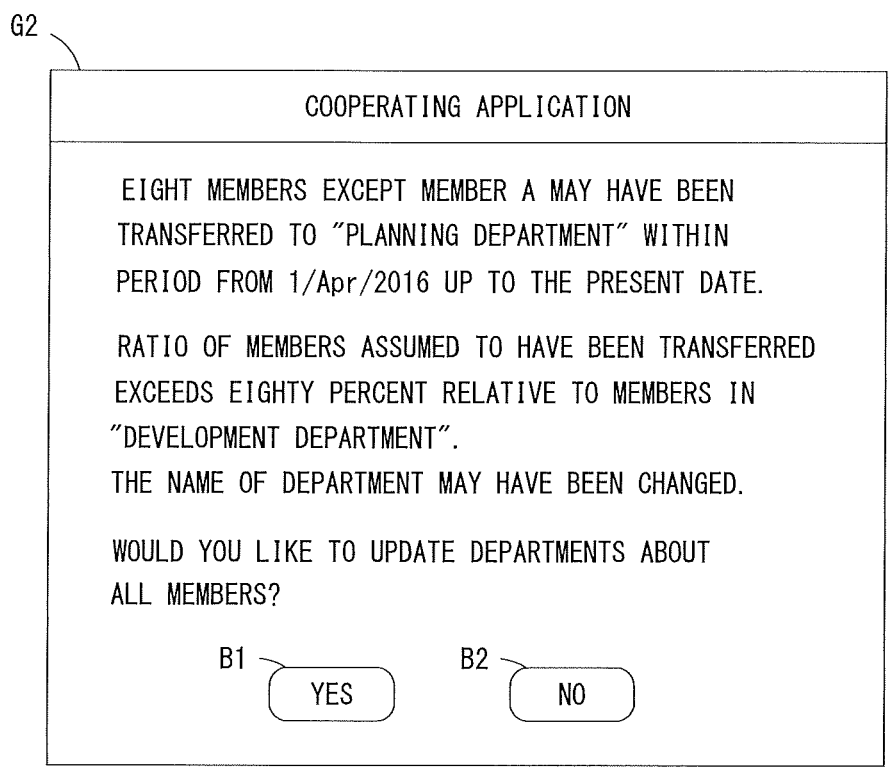
FIG. 14 shows an example of an inquiry screen used for an inquiry as to whether or not departments are to be updated collectively.

FIG. 14 shows an example of an inquiry screen G2 displayed on the information processing apparatus 6 used for an inquiry as to making of collective updates on the departments 14c. The screen G2 is to be transmitted to the information processing apparatus 6 by the notifying unit 38 of the second updating unit 37. The screen G2 is an example of a screen used if the name of a department where the member A belonged formerly has probably been changed and used for making an inquiry as to whether or not the departments 14c about all members belonging in the former department of the member A are to be changed collectively. Like on the screen G1 of FIG. 8, a lower part of the displayed screen G2 contains two buttons, a button B1 and a button B2. By operating either the button B1 or the button B2 on the screen G2, an information input user is allowed to give an instruction as to whether or not the departments 14c about all members belonging in the former department of the member A are to be changed collectively. If the application on the information processing apparatus 6 detects operation by the information input user, the application transmits information based on the operation to the client information management apparatus 2. Then, the client information management apparatus 2 is caused to make updates collectively based on the instruction from the information input user.

Figure 15:
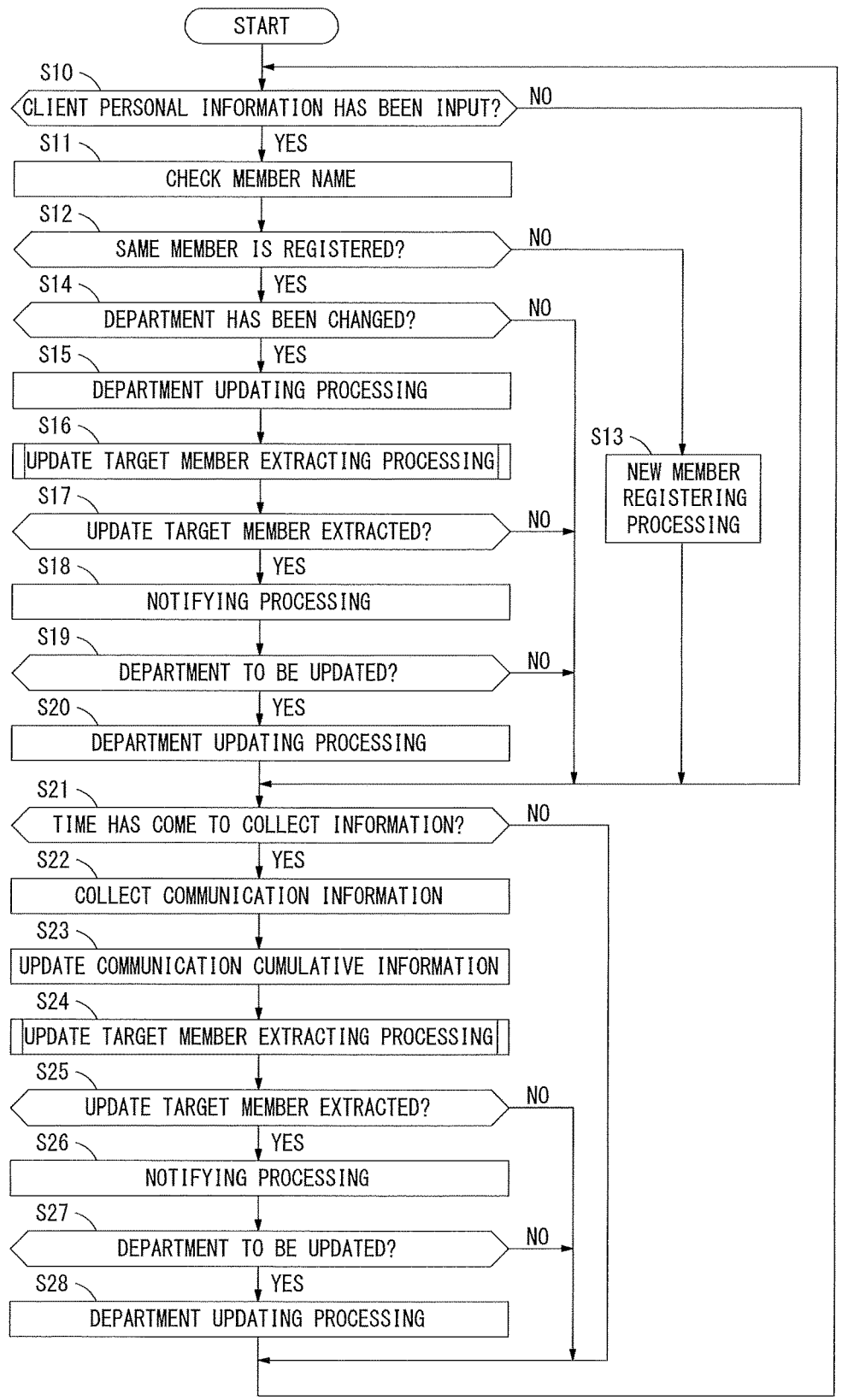
FIG. 15 is a flowchart showing an example of a procedure of processing performed by the client information management apparatus.

A procedure of processing performed by the client information management apparatus 2 of the above-described configuration will be described next. FIGS. 15 and 16 are flowcharts each showing an example of the procedure of processing performed by the client information management apparatus 2. This processing is performed by reading and execution of the program 13 by the CPU 10a of the client information management apparatus 2. After the processing is started, the client information management apparatus 2 first determines whether or not input of client personal information D1 from the information processing apparatus 6 or the image processing apparatus 7 has been detected (step S10), as shown in FIG. 15. If input of client personal information D1 has not been detected (step S10: NO), the processing by the client information management apparatus 2 proceeds to step S21.

In contrast, if input of client personal information D1 has been detected (step S10: YES), the client information management apparatus 2 operates the information analyzing unit 33 to make the information analyzing unit 33 determine whether or not a member name in the client personal information D1 is registered with the client information 14 (step S11). At this time, the client information management apparatus 2 operates the information extracting unit 32, where necessary, to make the information extracting unit 32 perform processing of extracting information such as the member name from the client personal information D1. If the information analyzing unit 33 determines that the member name in the client personal information D1 is not registered with the client information 114 (step S12: NO), the new registering unit 34 is operated for registration of a new member. Then, the new registering unit 34 registers information about the new member in the client personal information D1 such as the member name, a department, etc. with the client information 14 (step S13).

If the information analyzing unit 33 determines that a member name same as the member name in the client personal information D1 is already registered with the client information 14 (step S12: YES), the first updating unit 35 is operated. Then, the first updating unit 35 compares a department in the client personal information D1 and the department 14c registered with the client information 14 to determine whether or not the department of the member has been changed (step S14). If the first updating unit 35 determines that the department has not been changed (step S14: NO), the processing by the client information management apparatus 2 proceeds to step S21. Meanwhile, if the first updating unit 35 determines that the department has been changed (step S14: YES), the first updating unit 35 updates the department 14c about a client member corresponding to the input client personal information D1 (step S15).

Next, the update target extracting unit 36 is operated in the client information management apparatus 2. Then, the update target extracting unit 36 performs update target member extracting processing (step S16). The update target member extracting processing will be described in detail later. If an update target member has not been extracted by the update target member extracting processing (step S17: NO), the processing by the client information management apparatus 2 proceeds to step S21. If an update target member has been extracted by the update target member extracting processing (step S17: YES), the second updating unit 37 is operated. Then, the second updating unit 37 operates the notifying unit 38 to make the notifying unit 38 ask an information input user having input the client personal information D1 to determine whether or not the department 14c about the update target member is to be updated (step S18). If the second updating unit 37 is to update the department 14c about the update target member in response to an instruction from the information input user (step S19: YES), the second updating unit 37 thereafter performs processing of updating the department 14c about the update target member (step S20). In contrast, if the department 14c about the update target member is not to be updated (step S19: NO), the client information management apparatus 2 proceeds to step S21 by skipping step S20.

Next, the client information management apparatus 2 determines whether or not time has come to collect communication information D2 from the mail server 8a, for example (step S21). If time to collect communication information D2 has not come (step S21: NO), the client information management apparatus 2 returns to step S10 and repeats the above-described processing. In contrast, if time has come to collect communication information D2 (step S21: YES), the client information management apparatus 2 operates the crawler 20. Then, the crawler 20 accesses each of the mail server 8a, the document server 8b, and the web meeting server 8c to collect communication information D2 from each of the mail server 8a, the document server 8b, and the web meeting server 8c (step S22). Then, the crawler 20 records the communication information D2 as an additional entry collected from each of the mail server 8a, the document server 8b, and the web meeting server 8c into the communication cumulative information 15, thereby updating the communication cumulative information (step S23). Then, the processing by the crawler 20 is finished.

As the new communication information D2 is accumulated in the communication cumulative information 15, the client information management apparatus 2 operates the update target extracting unit 36. Then, the update target extracting unit 36 performs update target member extracting processing (step S24). This update target member extracting processing is the same as the above-described processing in step S16 and will be described in detail later. If an update target member has not been extracted by the update target member extracting processing (step S25: NO), the processing by the client information management apparatus 2 returns to step S10. If an update target member has been extracted by the update target member extracting processing (step S25: YES), the second updating unit 37 is operated in the client information management apparatus 2. Then, the second updating unit 37 operates the notifying unit 38 to make the notifying unit 38 ask the information input user having input the client personal information D1 to determine whether or not the department 14c about the update target member is to be updated (step S26). If the second updating unit 37 is to update the department 14c about the update target member in response to an instruction from the information input user (step S27: YES), the second updating unit 37 thereafter performs processing of updating the department 14c about the update target member (step S28). In contrast, if the department 14c about the update target member is not to be updated (step S27: NO), the client information management apparatus 2 returns to step S10 by skipping step S28.

FIG. 16 is a flowchart showing an example of a procedure of the update target member extracting processing (steps S16 and S24) in detail. When the update target member extracting processing is started, the update target extracting unit 36 first identifies the updated member whose department 14c has been changed in step S15 (step S40). Next, the update target extracting unit 36 performs processing of reading communication information D2 accumulated in the communication cumulative information 15 (step S41) and extracting every participant in a communication the updated member participated in (step S42). If the update target extracting unit 36 fails to extract every participant in a communication the updated member participated in (step S43: NO), the update target extracting unit 36 finishes the update target member extracting processing.

If the update target extracting unit 36 succeeds in extracting every participant in a communication the updated member participated in (step S43: YES), the update target extracting unit 36 identifies a participant who participated in this communication and belonging in the former department 14g about the updated member (step S44). If the update target extracting unit 36 fails to identify a participant belonging in the former department 14g about the updated member (step S45: NO), the update target extracting unit 36 finishes the update target member extracting processing. In contrast, if the update target extracting unit 36 succeeds in identifying a participant belonging in the former department 14g about the updated member (step S45: YES), the update target extracting unit 36 determines whether or not the department 14c about the identified participant has been updated within the check period (step S46). If the department 14c about the identified participant is determined to have been updated within the check period (step S46: YES), the update target extracting unit 36 finishes the update target member extracting processing. If the department 14c about the identified participant is determined not to have been updated within the check period (step S46: NO), the update target extracting unit 36 decides the identified participant to be an update target member (step S47).

If the participant extracted in step S42 includes a plurality of participants, the update target extracting unit 36 performs the above-described processing from steps S44 to S47 on each of these participants. By doing so, the update target extracting unit 36 is allowed to decide a plurality of members relating to the updated member to be update target members.

Next, the update target extracting unit 36 checks the number of client members registered with the client information 14 whose the departments 14c are the same as the former department 14g about the updated member (step S48). Then, the update target extracting unit 36 determines whether or not the number of these update target members decided in step S47 has a given ratio or more relative to the number of the registered client members (step S49). If the ratio of the number of the update target members is determined to be less than the given ratio relative to the number of the registered client members belonging in the former department 14g about the updated member (step S49: NO), the update target extracting unit 36 finishes the update target member extracting processing. In contrast, if the ratio of the number of the update target members is determined to be the given ratio or more relative to the number of the registered client members belonging in the former department 14g about the updated member (step S49: YES), the update target extracting unit 36 decides all the client members belonging in the same department as the former department 14g about the updated member to be update target members (step S50). Then, the update target extracting unit 36 finishes the update target member extracting processing.

In response to a case where some of a plurality of members belonging in the same department of a client company have been transferred together to a different department, the client information management apparatus 2 performs the above-described processing to allow these transferred members to be extracted automatically as update target members. Thus, the client information management apparatus 2 is not required to ask an information input user having input client personal information D1 to make determinations one by one as to whether or not information about each of a plurality of members belonging in the same department of the client company is to be updated. This achieves reduction in a work burden on the information input user.

Modifications

The present invention is not to be limited to the substance of the above-described preferred embodiment but various modifications are applicable to the present invention.

For example, in the exemplary case of the above-described preferred embodiment, the client information management apparatus 2 is provided on the Internet network 3. Alternatively, the client information management apparatus 2 can be provided in local network environment such as offices. In the exemplary case of the above-described preferred embodiment, the client information 14 and the communication cumulative information 15 are stored in the same storage 11. Alternatively, the client information 14 and the communication cumulative information 15 can be stored and managed in different storages.

While not specifically mentioned in the above-described preferred embodiment, information about the date of change 14f and the former department 14g recorded in the client information 14 can be cleared, for example at the end of the check period. This works advantageously as the field of the date of change 14f and that of former department 14g in the client information 14 can be reset completely to their initial states at the time of start of a new check period.

Although the embodiment of the present invention has been described and illustrated in detail, it is clearly understood that the same is by way of illustration and example only and not limitation, the scope of the present invention should be interpreted by terms of the appended claims.

What is claimed is:

1. A client information management apparatus comprising:
    a personal information receiver that accepts input of client personal information containing the name of a client member and a department where the client member belongs;
    a client information storage that stores client information containing information about a client member registered based on the client personal information accepted by the personal information receiver;
    a communication information storage that stores communication cumulative information containing accumulation of communication information about communication with the client member; and
    a hardware processor, wherein
    the hardware processor performs:
    registering one client member as a new client member when the one client member does not match a member name in the client personal information accepted by the personal information receiver;
    determining that the one client member matching the member name in the client information has not been transferred to a different department when a department in the accepted client personal information and a department about the one client member registered with the client information is the same;
    updating the department about the one client member in the client information when the member name in the client personal information accepted by the personal information receiver is the same as the member name about the one client member registered with the client information and when the department in the accepted client personal information differs from the department about the one client member registered with the client information;
    referring to the communication information accumulated in the communication cumulative information and extracting a member relating to the one client member as an update target member from different client members registered with the client information when the department about the one client member is updated; and
    updating a department about the update target member registered with the client information to the same department as the one client member.

2. The client information management apparatus according to claim 1, wherein
    the hardware processor extracts a member as the update target member by referring to the communication information accumulated in the communication cumulative information, the member being extracted as the update target member participating in the same communication as the one client member and belonging in the same department as a former department about the one client member.

3. The client information management apparatus according to claim 1, wherein
    when the hardware processor extracts the update target member, the hardware processor asks an information input user having input the client personal information to the personal information receiver to determine whether or not the department about the update target member is to be updated, and when the information input user instructs a change in the department about the update target member, the hardware processor updates the department about the update target member to the same department as the one client member.

4. The client information management apparatus according to claim 1, wherein
    the communication cumulative information is generated by accumulating electronic mails transmitted and received to and from the client member, and
    when the hardware processor updates the department about the one client member, the hardware processor extracts an electronic mail containing an electronic mail address of the one client member recorded as a destination address or a source address from the communication cumulative information, and extracts the update target member based on a different electronic mail address listed as destination address or a source address of the extracted electronic mail.

5. The client information management apparatus according to claim 1, wherein
    the communication cumulative information is generated by accumulating minutes of meetings with the client member, and
    when the hardware processor updates the department about the one client member, the hardware processor extracts the minutes of a meeting containing the one client member recorded as a participant from the communication cumulative information, and extracts the update target member based on information about a different participant recorded in the extracted minutes of the meeting.

6. The client information management apparatus according to claim 1, wherein
    the communication cumulative information is generated by accumulating history information or reservation information about web meetings with the client member, and
    when the hardware processor updates the department about the one client member, the hardware processor extracts history information or reservation information containing the one client member recorded as a participant from the communication cumulative information, and extracts the update target member based on information about a different participant recorded in the extracted history information or reservation information.

7. The client information management apparatus according to claim 1, wherein
    when the hardware processor updates the department about the one client member, the hardware processor extracts the update target member by reading communication information within a given period from the communication cumulative information and referring to the read communication information.

8. The client information management apparatus according to claim 7, wherein
    the given period covers a past period before the time of update on the department about the one client member, and when the hardware processor updates the department about the one client member, the hardware processor extracts the update target member by reading communication information in the past period from the communication cumulative information and referring to the read communication information.

9. The client information management apparatus according to claim 7, wherein
the given period covers a future period after the time of update on the department about the one client member, and
the hardware processor extracts the update target member by referring to communication information newly accumulated in the communication cumulative information within a period from the time of update on the department about the one client member to expiry of the future period.

10. The client information management apparatus according to claim 7, wherein
the given period is any one of a one-year period, a half-year period, and a quarterly period.

11. The client information management apparatus according to claim 7, wherein
the hardware processor excludes a client member whose department has been updated within the given period from the update target member.

12. The client information management apparatus according to claim 1, wherein
the hardware processor extracts the update target member from client members recorded in multiple pieces of communication information accumulated in the communication cumulative information as members having communicated with the one client member.

13. The client information management apparatus according to claim 1, wherein
when multiple pieces of communication information accumulated in the communication cumulative information have records indicating that a plurality of client members have communicated with the one client member and all of the plurality of client members are the same, the hardware processor extracts the update target member from the plurality of client members.

14. The client information management apparatus according to claim 1, wherein
when members of a given number or more out of a plurality of client members are extracted as update target members, the hardware processor extracts all of the plurality of client members as update target members, the plurality of client members being registered as belonging in the same department as a former department about the one client member.

15. A non-transitory recording medium storing a computer readable program, execution of the computer readable program by a computer causing the computer to perform:
accepting input of client personal information containing the name of a client member and a department where the client member belongs;
managing client information containing information about the client member registered based on the accepted client personal information accepted;
managing communication cumulative information containing accumulation of communication information about communication with the client member;
registering one client member as a new client member when the one client member does not match a member name in the client personal information accepted by the personal information receiver;
determining that the one client member matching the member name in the client information has not been transferred to a different department when a department in the accepted client personal information and a department about the one client member registered with the client information is the same;
updating the department about the one client member in the client information when the member name in the client personal information is the same as the member name about the one client member registered with the client information and when the department in the accepted client personal information differs from the department about the one client member;
referring to the communication information accumulated in the communication cumulative information and extracting a member relating to the one client member as an update target member from different client members registered with the client information when the department about the one client member is updated; and
updating a department about the update target member registered with the client information to the same department as the one client member.

16. The non-transitory recording medium according to claim 15, wherein the computer readable program causes the computer to perform:
extracting a member as the update target member by referring to the communication information accumulated in the communication cumulative information, the member being extracted as the update target member participating in the same communication as the one client member and belonging in the same department as a former department about the one client member.

17. The non-transitory recording medium according to claim 15, wherein the computer readable program causes the computer to perform:
asking an information input user having input the client personal information to determine whether or not the department about the update target member is to be updated when the update target member is updated, and updating the department about the update target member to the same department as the one client member when the information input user instructs a change in the department about the update target member.

18. The non-transitory recording medium according to claim 15, wherein
the communication cumulative information is generated by accumulating electronic mails transmitted and received to and from the client member, and
the computer readable program causes the computer to perform:
extracting an electronic mail containing an electronic mail address of the one client member recorded as a destination address or a source address from the communication cumulative information, and extracting the update target member based on a different electronic mail address listed as a destination address or a source address of the extracted electronic mail when the department about the one client member is updated.

19. The non-transitory recording medium according to claim 15, wherein
the communication cumulative information is generated by accumulating minutes of meetings with the client member, and
the computer readable program causes the computer to perform:

extracting the minutes of a meeting containing the one client member recorded as a participant from the communication cumulative information, and extracting the update target member based on information about a different participant recorded in the extracted minutes of the meeting when the department about the one client member is updated.

20. The non-transitory recording medium according to claim 15, wherein the communication cumulative information is generated by accumulating history information or reservation information about web meetings with the client member, and the computer readable program causes the computer to perform:

extracting history information or reservation information containing the one client member recorded as a participant from the communication cumulative information, and extracting the update target member based on information about a different participant recorded in the extracted history information or reservation information when the department about the one client member is updated.

21. The non-transitory recording medium according to claim 15, wherein the computer readable program causes the computer to perform:

extracting the update target member by reading communication information within a given period from the communication cumulative information and referring to the read communication information when the department about the one client member is updated.

22. The non-transitory recording medium according to claim 21, wherein the given period covers a past period before the time of update on the department about the one client member, and the computer readable program causes the computer to perform:

extracting the update target member by reading communication information in the past period from the communication cumulative information and referring to the read communication information when the department about the one client member is updated.

23. The non-transitory recording medium according to claim 21, wherein the given period covers a future period after the time of update on the department about the one client member, and the computer readable program causes the computer to perform:

extracting the update target member by referring to communication information newly accumulated in the communication cumulative information within a period from the time of update on the department about the one client member to expiry of the future period.

24. The non-transitory recording medium according to claim 21, wherein the given period is any one of a one-year period, a half-year period, and a quarterly period.

25. The non-transitory recording medium according to claim 21, wherein the computer readable program causes the computer to perform:

excluding a client member whose department has been updated within the given period from the update target member.

26. The non-transitory recording medium according to claim 15, wherein the computer readable program causes the computer to perform:

extracting the update target member from client members recorded in multiple pieces of communication information accumulated in the communication cumulative information as members having communicated with the one client member.

27. The non-transitory recording medium according to claim 15, wherein the computer readable program causes the computer to perform:

extracting the update target member from a plurality of client members if multiple pieces of communication information accumulated in the communication cumulative information have records indicating that the plurality of client members has communicated with the one client member and all of the plurality of client members in the multiple pieces of communication information are the same.

28. The non-transitory recording medium according to claim 15, wherein the computer readable program causes the computer to perform:

extracting all of a plurality of client members as update target members when members of a given number or more out of the plurality of client members are extracted as update target members, the plurality of client members being registered as belonging in the same department as a former department about the one client member.

* * * * *